Dec. 30, 1952   C. J. CROWLEY   2,623,747
INFLATABLE ATHLETIC BALL AND METHOD OF MAKING
Filed Jan. 24, 1947   5 Sheets-Sheet 1
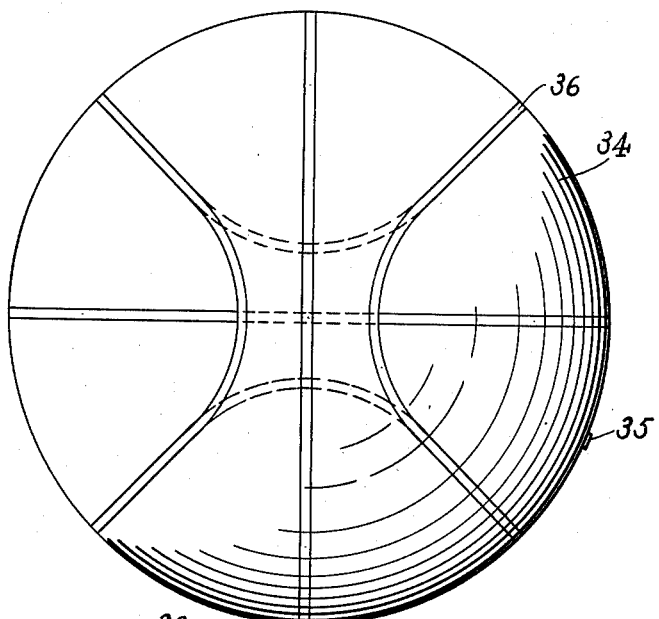
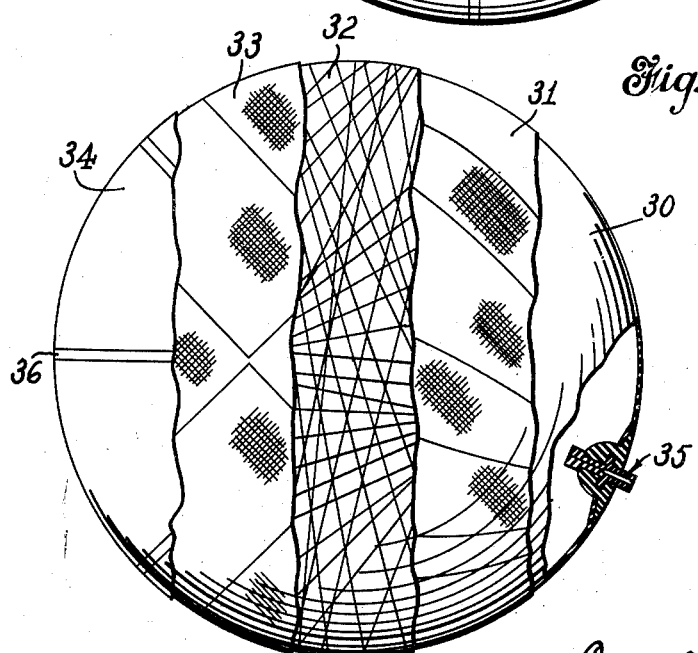
Inventor
Cornelius J. Crowley
By Rockwell & Bartholow
Attorneys Dec. 30, 1952  C. J. CROWLEY  2,623,747
INFLATABLE ATHLETIC BALL AND METHOD OF MAKING
Filed Jan. 24, 1947  5 Sheets-Sheet 2
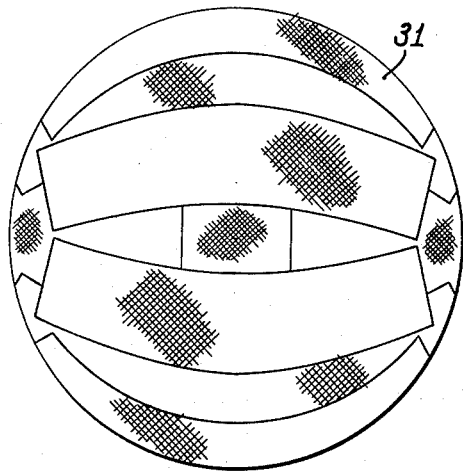
Fig.3.
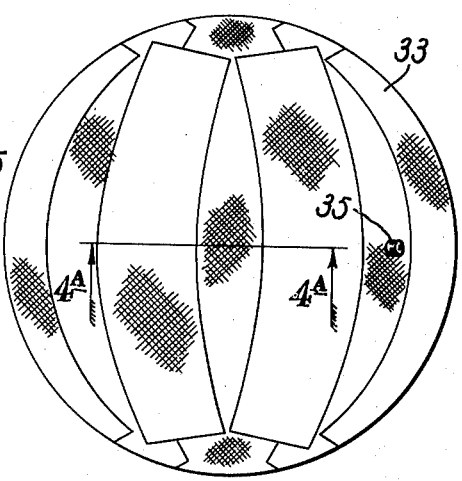
Fig.4.
Fig.5.
Fig.6.
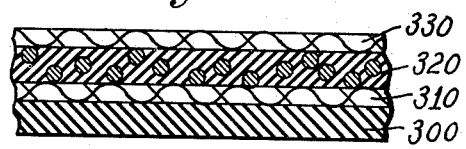
Fig.7.
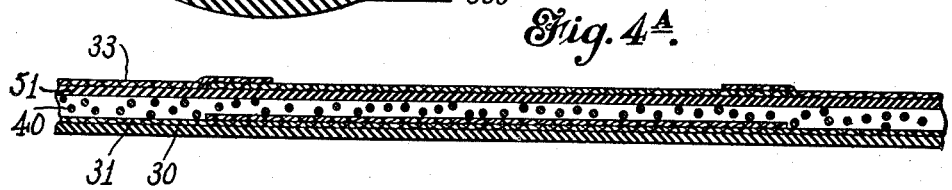
Fig.4ᴬ.
Inventor
Cornelius J. Crowley
By Rockwell & Bartholow
Attorneys Dec. 30, 1952 — C. J. CROWLEY — 2,623,747
INFLATABLE ATHLETIC BALL AND METHOD OF MAKING
Filed Jan. 24, 1947

Inventor
Cornelius J. Crowley
By Rockwell & Bartholow
Attorneys

Dec. 30, 1952 C. J. CROWLEY 2,623,747
INFLATABLE ATHLETIC BALL AND METHOD OF MAKING
Filed Jan. 24, 1947 5 Sheets-Sheet 4

Inventor
Cornelius J. Crowley
By Rockwell & Bartholow
Attorneys

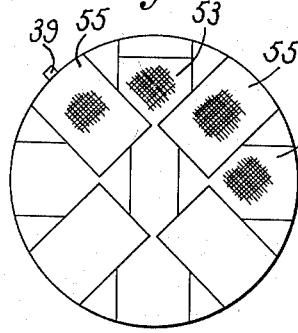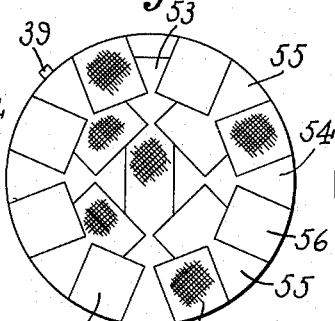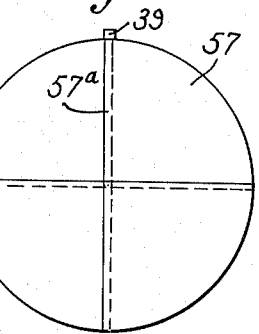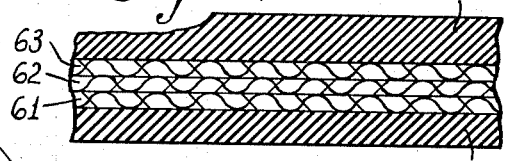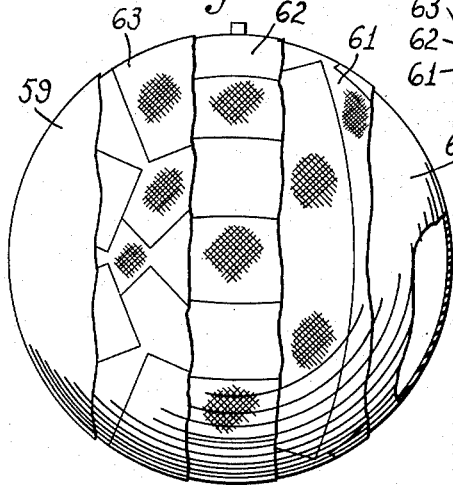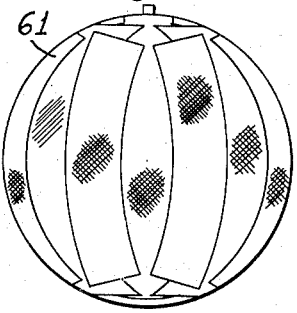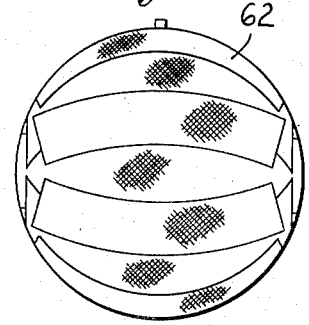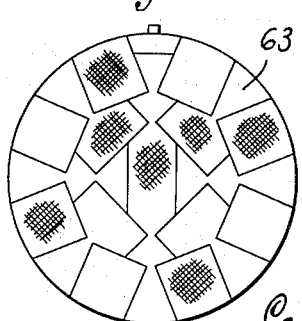

Patented Dec. 30, 1952

2,623,747

UNITED STATES PATENT OFFICE 2,623,747

INFLATABLE ATHLETIC BALL AND METHOD OF MAKING

Cornelius J. Crowley, New Haven, Conn., assignor to The Seamless Rubber Company, New Haven, Conn., a corporation of Connecticut Application January 24, 1947, Serial No. 724,003

26 Claims. (Cl. 273—65)

This invention relates to inflatable athletic balls, and, while not limited thereto, the invention has particular reference to a spherical ball such as a basketball or volley ball.

An object of the invention is to produce a ball which, as manufactured, is shaped very accurately, and which, in hard service, maintains its original shape and size.

Another object is to improve articles of this general class, and especially those in which the bladder and the bladder covering are bonded together in a so-called carcass to which a suitable finishing layer is applied.

Another object is to provide an improved structure of carcass wall.

Another object is to facilitate the manufacture of the carcass and provide one which is very strong and durable and offers especially high resistance to deformation.

In the accompanying drawings:

Fig. 1 is an elevation of a basketball constructed in accordance with the invention;

Fig. 2 is an elevation with the wall broken away to disclose the several layers;

Fig. 3 is an elevation of the ball before completion, illustrating the first layer of fabric strips applied to the bladder;

Fig. 4 is an elevation of the ball in the process of manufacture, illustrating the arrangement of fabric strips in the second or outer strip layer;

Fig. 4A is an enlarged section on line 4A—4A of Fig. 4;

Fig. 5 is an enlarged section through the wall of the completed ball;

Fig. 6 is an enlarged section of the wall of a ball of modified construction having a leather finishing layer;

Fig. 7 is a sectional view of a ball carcass;

Figs. 8 to 19, inclusive, are views that are somewhat diagrammatic, illustrating the different steps in making a rubber-covered ball such as shown in Fig. 1;

Fig. 20 is a view similar to Fig. 2, illustrating a ball of modified structure;

Fig. 21 is an enlarged sectional view of the wall of the ball of Fig. 20; and

Figs. 22, 23 and 24 illustrate steps in the manufacture of the ball of Fig. 20.

For purposes of illustration, and by way of example, there is described a basketball and the steps employed in its manufacture. The ball shown in Figs. 1, 2 and 5 has an outer cover or finishing layer of rubber, the term "rubber" being used in a broad sense so as to include rubberlike material as well as natural rubber and synthetic rubber. In the form shown in Fig. 6 the finishing layer consists of pieces of leather, or imitation leather. The ball is of spherical shape, but in certain aspects the invention is not limited to a spherical ball.

As disclosed in Fig. 2, the ball has an inflatable rubber bladder, indicated at 30, a carcass wall having an inner layer 31, an intermediate layer 32, and an outer layer 33, and over this carcass wall a rubber finishing layer 34. The bladder is provided with a suitable rubber valve, indicated generally at 35, adapted to receive an inflating needle. This valve may advantageously be of the type disclosed in the De Laney and Madsen Patent No. 2,065,121, dated December 22, 1936. The rubber finishing layer 34 may have molded upon it at its exterior surface a groove formation, indicated at 36.

Figure 3A:
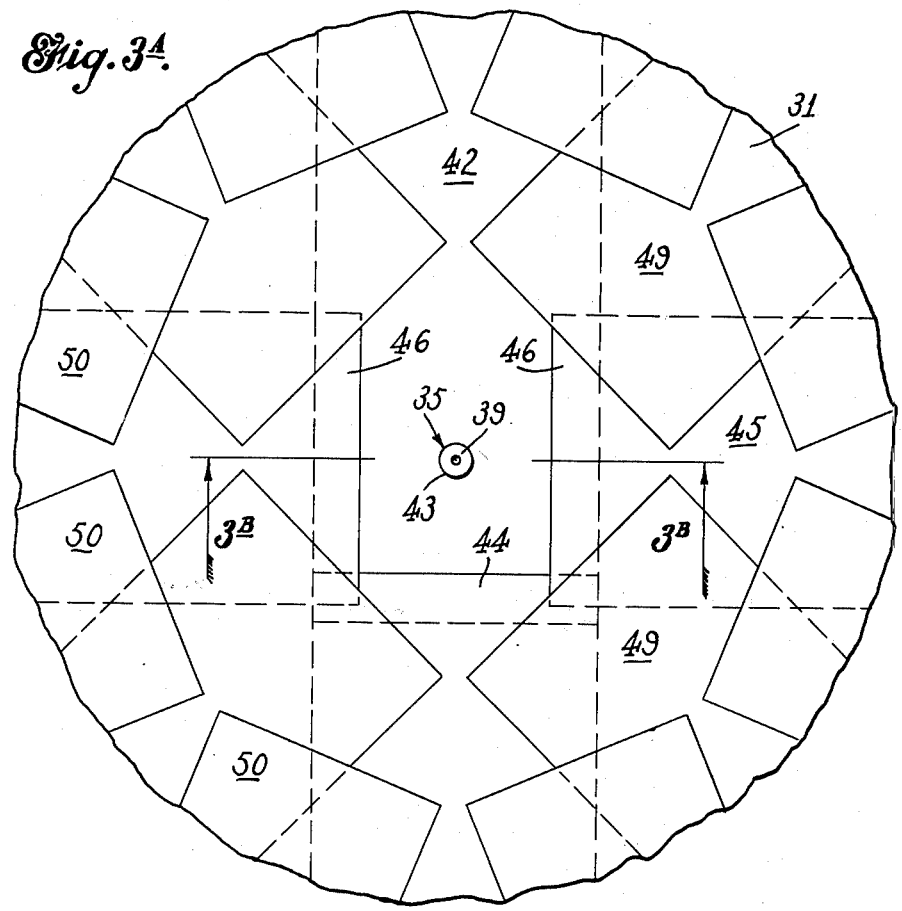
Figure. 3A is an enlarged view of the article shown in Fig. 3, illustrating the arrangement of the strips in the region of the inflating valve.
Figure 3B:
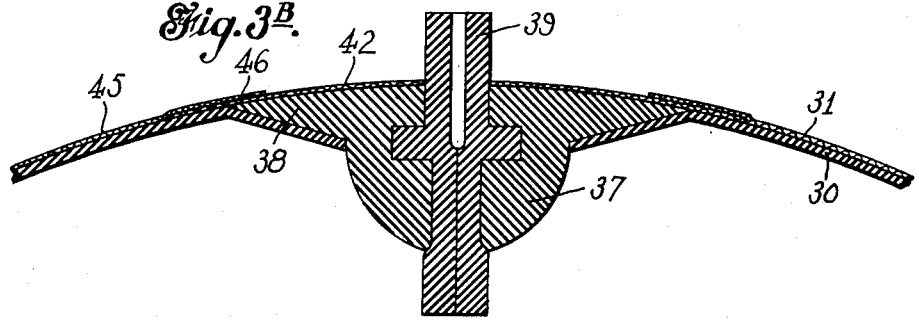
Fig. 3B is an enlarged section on line 3B—3B of Fig. 3A.

Reverting to the inflating valve 35, this may have a rubber body 37 provided at the upper portion (Fig. 3B) with a securing flange 38, the body 37 being received in an opening of the bladder, and the flange 38 overlying and being secured to a portion of the bladder wall around the opening. Projecting upwardly from the valve body 37 (Fig. 3B) is a rubber stem portion 39 of the valve into which the inflating needle is introduced.

The layers 31, 32 and 33 are bonded and vulcanized to create a strong strain-resisting wall confining the bladder. The layer 31 of this wall comprises a plurality of fabric strips in which the threads run on the bias. These strips are rubberized, being impregnated with uncured rubber so that when one strip is applied to the surface of the bladder it adheres thereto, and so that it is possible to adhere a strip to an underlying strip in creating a fabric layer that encases the bladder. In the form shown, some of the strips employed in layer 31 are of a width of approximately two inches, while others are somewhat narrower, as will hereinafter appear. The layer 32 comprises a number of turns of thread wound on great circles, and it also comprises a body of rubber in which the thread turns are embedded. The thread is indicated at 40, and the rubber in which the thread is embedded is indicated at 41. Before winding on the thread it may be impregnated with uncured rubber, as will hereinafter appear. The fabric layer 33 is similar in character to the layer 31, being composed of a plurality of strips of rubberized fabric, but these strips are preferably arranged to break joint with the strips on the under layer, as will hereinafter appear.

The structure of the ball wall will be more fully understood from the following description of a preferred method of constructing the ball.

Figure 8:
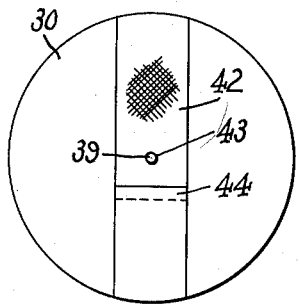

The bladder is inflated to a slight extent to create a resilient but fairly firm sphere, and the construction of the first fabric layer is commenced by the step shown in Fig. 8, which step comprises the encirclement of the bladder by a fabric strip or tape 42, and the affixing of the strip to the bladder surface. The strip is impregnated with uncured rubber and readily adheres to the bladder. Near one extremity the strip is provided with a perforation 43 which enables that portion of the strip to be fitted about the projecting stem of the valve. Slightly to one side of the perforation 43 the other end of the strip is slightly overlapped upon the end portion having the perforation to create a lap joint 44.

Figure 9:
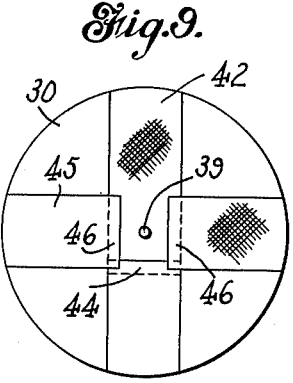
Figure 10:
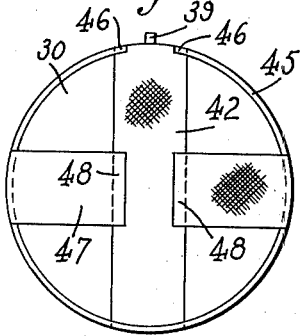
Figure 11:
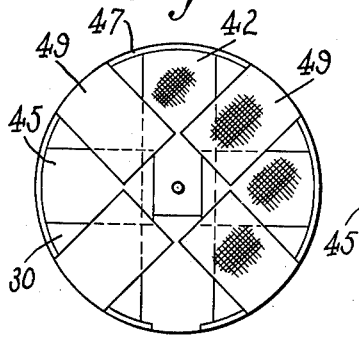

Considering the valve stem 39 as a pole through which the great circle of strip 42 passes to create a meridian strip, the next step is to apply to the bladder a second meridian strip 45, as shown in Fig. 9, located in a plane at 90° to the plane of strip 42. This strip 45, as shown in Fig. 9, has its terminals spaced away from the pole represented by the valve stem 39, the terminals of the strip being slightly lapped on and adhered to the strip 42, as indicated at 46. The next step, which is shown in Fig. 10, consists in the application of a third fabric strip 47, which in respect to the first two strips has an equatorial location. This strip crosses and is applied and fixed to the intermediate portions of strip 45, and has its terminals 48 spaced apart from each other and slightly lapped on and affixed to the strip 42.

Figure 12:
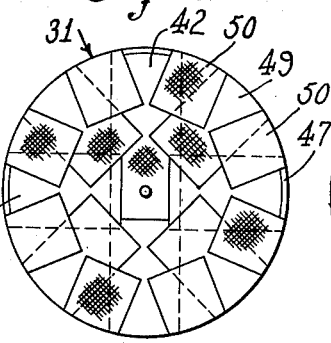

The strips 42, 45 and 47 are preferably strips of the same width, say approximately two inches, and the next step consists in applying to the article shown in Fig. 10 four meridian strips 49, which partially fill the open or vacant quadrant-shaped spaces, these meridian strips 49 preferably being of the same width as the three primary strips above described. The strips 49 are disposed on great circles intersecting the pole 39 and its opposite pole. The strips 49 are adhesively applied to the bladder and to the other strips, and they have their terminals spaced from the poles, as shown, for example, in Fig. 11, and their terminals, as shown in this figure, are lapped over the meridian strips 42 and 45 and adhesively connected thereto. The operation shown in Fig. 11 leaves the article with some small portions of the bladder surface uncovered, and the next step is to cover these places by the use of additional meridian strips, as shown in Fig. 12. These additional meridian strips are indicated at 50, and in this case there are eight of them, and they are substantially narrower than the strips previously applied, and also substantially shorter, being located so that their terminals are farther away from the poles than are the terminals of strips 49. As shown in Fig. 12, each strip 50 covers the existing open space on the bladder surface and is adhesively applied to said surface and laps slightly on and is affixed to the adjacent meridian strips that have been previously applied. Each terminal of a strip 50 is adhesively connected to one of the primary meridian strips 42 or 45, and to one of the secondary meridian strips 49, and the middle portion of each strip 50 is applied over and affixed to the equatorial strip 47.

Figure 13:
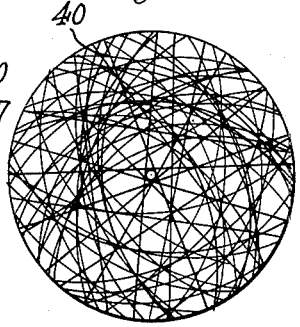
Figure 14:
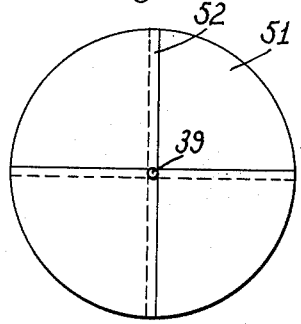
Figure 15:
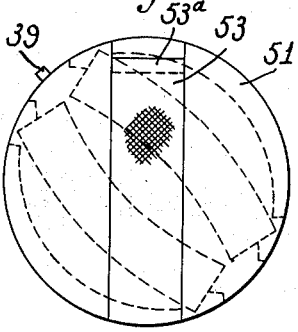
Figure 16:
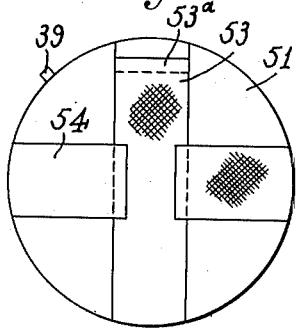

The next step is to take the article as shown in Fig. 12 and wind it with thread, as shown in Fig. 13. For this purpose the article is placed in a suitable winding machine, which winds on a length of thread substantially on great circles, with a suitable amount of tension so as to form a strain-resisting layer of thread. The thread as wound on the ball may be coated with uncured rubber, and this is the preferable procedure, but in some cases a plain thread can be used.

The next step is the application to the wound ball of a layer of uncured rubber. It is preferred to encase the wound ball within a thin layer of uncured rubber sheeting, and this layer may consist of quadrants 51 of sheet material interconnected in generally spherical shape by having their adjacent edge portions lapped, as shown at 52, and adhesively secured together.

The next step after the application of the rubber cover 51 is the application of the second fabric layer 33, and this involves the operations illustrated in Figs. 15 to 18, inclusive. The layer 33 is similar to layer 31, but there are some differences in detail. Strip 53 is first applied to the underlying rubber surface, being disposed on a great circle and having its ends slightly overlapped, as shown at 53ª. In this particular case the great circle of strip 53 is offset approximately 45° from the pole represented by the valve stem 39. The next strip applied is strip 54, shown in Fig. 16, which is an equatorial strip with respect to the strip 53, there being an omission in this second fabric layer of a strip corresponding to strip 45. The strip 54 corresponds to strip 47. Using the two primary strips 53 and 54, the next step is to cover the open quadrants of the rubber layer 51. In doing this, four strips 55 are used, as shown in Fig. 17, said strips corresponding to the strips 49, the poles from which they radiate being those at which the strips 53 and 54 meet each other. The next step, shown in Fig. 18, is to apply narrower and shorter filler pieces 56 corresponding to the filler pieces 50.

The next step is to apply uncured rubber for the formation of the outer rubber cover, and this may be done by applying sheet stock to the article to create a spherical enclosure, the latter being indicated at 57 in Fig. 19. In this particular case the cover comprises quadrants interconnected by lap joints 57ª.

The article of Fig. 19 is then placed in a suitable forming mold having a spherical cavity of a diameter slightly larger than that of the article, and while in the mold the article is inflated by connecting the inflating valve to a source of compressed air so as to cause the wall of the ball to be stretched and its outer surface forced into intimate contact with the forming surface of the mold. The result of this is that exteriorly the ball is given the accurate spherical shape of the mold, and the several layers of the wall forced together to create a thinner dense mass in which the layers are all in intimate contact. The internal air pressure may be one of say sixty-five pounds per square inch. The effect of such pressure is to force the bladder wall strongly against the first fabric layer, and the latter in turn against the layer 51 of uncured rubber, and as the latter layer is forced outwardly the thread turns are driven into it in an outward direction so as to provide an intermediate layer of thread and uncured rubber filling the space between the two fabric layers, as shown in Fig. 5. This intermediate layer is, of course, forced into intimate contact with the outer fabric layer, and the latter in turn is forced into intimate contact with the layer of uncured rubber 57 that is to form the cover or finishing layer. The pressure in the mold is maintained for about fifteen minutes, and during this period the mold is subjected to heat for purposes of vulcanization, the effect of which will be to vulcanize the uncured rubber in the layers which lie outside the bladder. The bladder, being pre-vulcanized, does not require vulcanization at this stage. After the inflation and heating, the article can be taken out of the mold, and will then be ready for use.

The ball as thus constructed has a relatively thin wall portion between the finishing layer and the bladder, owing to the fact that the fabric layers are relatively thin, and to the fact that the intermediate layer of rubber containing the thread turns is also relatively thin. The wall of the ball shown in Figs. 1, 2 and 5 may be of a total thickness of .115 inch. This dimension is given only by way of example, but it will be understood that the ball preferably has a thin resilient wall including strain-resisting layers that are ample for resisting growth or expansion as the ball is used. Moreover, the wall portion enclosing the bladder at all points effectively prevents deformation of the ball in use, and there is provided a ball which is initially a true sphere and which maintains a spherical shape notwithstanding hard usage.

An advantage in the use of the fabric strips or tapes, as above described, is that these strips, while thin, are very strong, and are relatively narrow so that they can readily be conformed snugly to the underlying spherical body in the process of manufacture. These strips are used to provide two or more primary strips that are located in perpendicular planes, and in the completed ball there are at least three of these strips in planes at 90° to each other, so that the primary strips provide strong resistance to strains in at least three directions. These primary strips, it may be said, provide the basis or the groundwork of the fabric enclosure, which, as above described, is completed by the application of filler strips that are placed over the quadrant-shaped open spaces, and narrower and shorter strips that cover the remaining spaces. In some cases it may not be necessary to employ the smaller strips so as to provide a complete coverage of fabric in a given layer, but it is preferred to arrange the strips substantially in the manner illustrated.

It is of advantage also to use at least two layers of fabric strips with an intervening layer of rubber in which are embedded the turns of thread or cord, because this provides an exceptionally strong wall that effectively resists growth and deformation in the ball when it is placed in use.

Fig. 4A is an enlarged view showing the carcass wall before the outer layer of uncured rubber is applied and the ball placed in the mold, and this view shows the relationship between the inner and outer fabric layers, the rather loose layer of thread-turns and the intermediate rubber layer before the article is subjected to interior pressure for the purpose of compacting and condensing the wall structure. The wall as compacted and condensed is shown on a larger scale in Fig. 5. The threads or cords are preferably of rayon or like material that will stretch in the molding operation but will not stretch after the ball has been vulcanized. It will be apparent from Fig. 4A that the outward pressure on the composite wall will cause the uncured rubber of layer 51 in Fig. 14 to create the intermediate rubber layer 41, shown in Fig. 5.

The intermediate rubber layer lies against the inner and outer fabric layers so as to give resilient support therefor, and acts as a cushioning or compensating element which tends to take up and compensate for inequalities and unevenness of the two fabric layers.

Fig. 6 shows a modified form of ball having layers 300, 310, 320 and 330 corresponding to layers previously described herein, and shown in Fig. 2, but in this case a finishing layer 58 of leather pieces is employed, the leather being applied after the carcass having an outer layer of fabric has been placed in the mold and molded and vulcanized. Fig. 7 shows the wall of such a carcass.

Figs. 20 to 24, inclusive, show a ball of modified construction, which in this particular case has an outer cover 59 of rubber, and an interior bladder 60. The layers 59 and 60 are parts of a composite wall embodying superimposed fabric layers, with omission of the thread layer previously described. In this case there are three layers 61, 62 and 63 of fabric strips, the first one being laid directly upon the bladder, the second being laid on the first, and the third on the second. The layer 61 may be the same as, or similar to, the first fabric strip layer used in the first form of ball. This layer may comprise three primary strips located in planes at 90° to each other, with additional meridian filler strips as in the first form described. The fabric strip layer 62 in this case has its poles on a great circle at 90° from the great circle of the poles first used, and the layer 62 is constructed similarly to the layer 33 in the first form, having the strip first applied corresponding to the strip 53, and having the strip next applied corresponding to the strip 54, with omission of a third primary strip. The layer 63 has its poles at 90° with respect to the poles of layer 62, and the strips in layer 63 may have the same arrangement as those in layer 62. It is believed that in view of the previous description a further description of the method of making this particular form of ball will be unnecessary.

In making a ball such as herein described, an important advantage arises from the fact that the fabric strips can be readily applied in the process of making the ball without highly skilled labor, it being unnecessary to pre-shape the fabric before it is applied to the bladder. Another notable advantage arises from the fact that by properly arranging the strips of a fabric layer with respect to those of another strip layer or layers, a ball can be furnished which is a true sphere and which in hard use retains its size and shape. A further advantage of the invention so far as the forms of Figs. 2, 6 and 7 are concerned is that the rubber-embedded thread layer located between inner and outer fabric layers composed of relatively narrow strips provides a ball which maintains its shape and size under playing conditions, and possesses additional meritorious features.

It is understood that the strips of the fabric layers are preferably bias-cut straight strips of a woven fabric of cotton yarn or the like, in which the yarns cross each other at right angles, the fabric being suitably rubberized. In making a basketball some of the strips used have a width of approximately two inches, although this dimension is given only by way of example. While the winding of thread is preferably on great circles, or substantially on great circles, there may be some variation as regards the disposition of the winding turns, as may be required by the character of the ball to be supplied.

Only a few forms of the invention are shown herein, and it is to be understood that various modifications and changes may be made in the ball structure without departing from the principles of the invention or the scope of the claims.

What I claim is:

1. An inflatable athletic ball comprising a spherical valve-equipped bladder, a layer of fabric pieces applied directly to said bladder, a layer of thread turns applied to said fabric layer, an outer layer of fabric applied to the thread turns comprising fabric strips of narrow width substantially encircling the ball disposed on great circles at 90° to each other and also comprising a plurality of shorter fabric strips acting as filler strips closing in spaces between the first strips and disposed on great circles, and a cover applied to said last-named layer.

2. An inflatable athletic ball comprising a spherical valve-equipped bladder, a great circle fabric strip applied directly to said bladder and having its ends slightly overlapped and interconnected, a second strip at right angles to the first but somewhat shorter than the first and having its ends slightly lapped on the first strip and secured thereto, a third strip at right angles to the second strip and to the first and of substantially the same length as the second strip having its ends slightly lapped on the first strip and secured thereto, filler pieces applied to the article as thus constructed so as to cover substantially the open quadrant-shaped spaces and thus provide a layer of fabric applied to the bladder so as to cover substantially all of its area, a layer of thread turns applied to said fabric layer, and a second layer of fabric applied outside of said thread turns.

3. An inflatable athletic ball comprising a spherical valve-equipped bladder, a great circle fabric strip applied directly to said bladder and having its ends slightly overlapped and interconnected, a second strip at right angles to the first but somewhat shorter than the first and having its ends slightly lapped on the first strip and secured thereto, a third strip at right angles to the second strip and to the first and of substantially the same length as the second strip having its ends slightly lapped on the first strip and secured thereto, filler pieces applied to the article as thus constructed so as to cover substantially the open quadrant-shaped spaces and thus provide a layer of fabric applied to the bladder so as to cover substantially all of its area, a layer of thread turns applied to said fabric layer, and a second layer of fabric applied outside of said thread turns, the second fabric layer comprising strips disposed on great circles and offset with relation to the strips of the first fabric layer.

4. An inflatable athletic ball comprising a spherical valve-equipped bladder, a great circle fabric strip applied directly to said bladder and having its ends slightly overlapped and interconnected, a second strip at right angles to the first but somewhat shorter than the first and having its ends slightly lapped on the first strip and secured thereto, a third strip at right angles to the second strip and to the first and of substantially the same length as the second strip having its ends slightly lapped on the first strip and secured thereto, filler strips applied to the article as thus constructed so as to cover substantially the open quadrant-shaped spaces and thus provide a layer of fabric strips applied to the bladder so as to cover substantially all of its area, a layer of thread turns applied to said fabric layer, and a second layer of fabric applied outside of said thread turns, the second fabric layer being composed of strips disposed on great circles and offset with relation to the strips of the first fabric layer, the second fabric layer including at least two primary strips disposed at right angles to each other, the said first and second strips of said first fabric layer corresponding to said primary strips, and said primary strips and the corresponding strips being disposed at angles to each other.

5. An inflatable athletic ball comprising a spherical valve-equipped bladder, primary fabric strips at 90° to each other applied adhesively directly to the bladder in great circles, a winding of thread outside of said strips, a body of elastic material in which said thread is embedded, a fabric layer outside of the thread winding, and a cover, the said fabric strips and the said fabric layer lying against said body of elastic material so as to be supported thereby.

6. An inflatable athletic ball of spherical shape having a valve-equipped bladder and outside of said bladder and joined thereto a wall including inner and outer layers of fabric of which the inner lies against the bladder, at least one of said layers including narrow fabric tapes on great circles disposed in planes at 90° to each other and substantially encircling the bladder, a layer of rubber between and lying against said fabric layers sufficiently soft to act as a cushioning and compensating layer, and thread turns embedded in said layer of rubber in a relatively narrow zone between said fabric layers.

7. An inflatable athletic ball of spherical shape having a valve-equipped bladder and outside of said bladder and vulcanized thereto a wall including a layer of fabric, the valve of said bladder projecting outwardly from the bladder, said fabric layer including a narrow bladder-encircling narrow tape of fabric having a perforation near one end through which said valve projects, the ends of said tape being interconnected by being overlapped at one side of said valve, and also including a further narrow tape of fabric in a plane at 90° to the first tape having its extremities in lapping adhesive engagement with the first tape.

8. An athletic ball of spherical shape having a composite wall structure including an inner valve-equipped inflatable bladder element and an outer cover element, a fabric layer in a number of pieces located between said elements and in contiguous relationship to one of them, said wall structure also having an intermediate layer comprising a body of elastic material of sufficient depth to provide a cushioning layer contiguous to and supporting said fabric layer at the side opposite the said one element, said elastic material having thread turns embedded therein, and said fabric layer comprising primary narrow tapes disposed on great circles at 90° to each other and substantially encircling the bladder and shorter filler tapes of narrow fabric covering the spaces left vacant by the primary tapes.

9. An inflatable athletic ball comprising a spherical valve-equipped bladder, a winding of thread turns disposed on great circles arranged exteriorly of the bladder in enclosing relation thereto, a cover, and a fabric layer interposed between said cover and said winding and joining the two together including narrow encircling tapes disposed in planes perpendicular to each other, said fabric layer also comprising shorter pieces arranged to cover in the spaces between said tapes, the valve of said bladder projecting outwardly from the bladder, and one of said tapes being provided with a perforation through which the valve extends.

10. A spherical athletic ball comprising a valve-equipped bladder, a cover, and a fibrous structure intermediate the bladder and the cover and bonded to both of them including narrow great-circle bladder-encircling tapes arranged in planes at 90° to each other, a plurality of narrow meridian filler tapes substantially bisecting the vacant spaces left between adjacent tapes and of less length than the first-mentioned tapes, and additional narrow meridian filler tapes alongside of said first-mentioned filler tapes which are of less length than the first filler tapes.

11. An inflatable athletic ball comprising a valve-equipped bladder of spherical shape, a fibrous covering over said bladder including a layer of thread turns disposed on great circles about said bladder, a layer applied to said thread turns comprising fabric strips of narrow width substantially encircling the ball disposed on great circles at 90° to each other and also comprising a plurality of shorter narrow strips of fabric alongside the first strips acting as filler strips and closing in the spaces between said encircling strips, and a cover applied to said last-named layer.

12. An inflatable athletic ball comprising a valve-equipped bladder of spherical shape having an outwardly projecting valve, a narrow fabric strip applied directly to said bladder on a great circle and having an aperture in which the valve is received and having the ends of said strip overlapped and interconnected, a second narrow fabric strip at right angles to the first but somewhat shorter than the first and having its ends slightly lapped on the first strip and secured thereto, a winding of thread turns disposed on great circles over said fabric strips, and a cover applied over said winding.

13. An inflatable athletic ball, comprising a valve-equipped bladder of spherical shape having an outwardly projecting valve, a narrow fabric strip applied directly to said bladder on a great circle and encircling the same and having an aperture between its ends in which the valve is received, a second narrow fabric strip encircling the bladder and disposed at an angle of 90° to the first strip, a winding of thread turns disposed on great circles over said narrow fabric strips, a cushioning layer of rubber in which said thread turns are embedded, and a cover applied over said winding.

14. The method of making an inflatable athletic ball which comprises providing a valve-equipped bladder, applying narrow fabric tapes directly to said bladder in adhesive relation thereto with said tapes disposed on great circles so as to create a substantially complete covering for the bladder, and then applying an additional covering layer outside of said layer of tapes, the second layer comprising turns of thread disposed on great circles.

15. The method of making an inflatable athletic ball which comprises providing a valve-equipped bladder, applying narrow fabric tapes adhesively to said bladder on great circles, said tapes comprising primary encircling tapes and shorter filler tapes so as to provide a substantially complete covering for the bladder, and then winding thread upon said covering.

16. The method of making an inflatable athletic ball which comprises providing a valve-equipped bladder, applying narrow fabric strips adhesively to said bladder on great circles so as to provide a substantially complete covering for the bladder, then winding thread upon said covering, then applying a layer of uncured rubber sheet over the thread, then applying a second layer of fabric and a cover to the article thus constructed, and then molding and vulcanizing the article.

17. The method of making an inflatable athletic ball which comprises providing a valve-equipped bladder, inflating the bladder, applying adhesively to the bladder on great circles fabric strips in the form of narrow tapes arranged at 90° to each other and encircling the bladder, and then adhesively applying to the bladder and to the first strips shorter strips disposed on great circles so as to cover over vacant spaces left between the first strips.

18. The method of making an inflatable athletic ball which comprises providing a valve-equipped bladder, inflating the bladder, applying to the external surface of the inflated bladder fabric strips disposed on great circles and substantially encircling the bladder in planes at angles to each other, applying covering pieces to cover the spaces left vacant by the strips so as to provide a fabric layer covering the bladder, winding on said layer a layer of thread turns, applying over said thread turns a layer of uncured rubber in sheet form and of sufficient depth to provide a cushioning layer, then applying over said last-named layer a second layer of fabric pieces so as to provide a complete covering for the article thus constructed, and molding the article under internal pressure acting to drive the thread turns into the surrounding rubber layer.

19. The method of making an inflatable athletic ball which comprises providing a valve-equipped bladder, applying to the inflated bladder a cover including a winding of thread turns disposed on great circles, then applying a layer of uncured rubber sheet over the thread winding, applying over the rubber sheet a fabric layer comprising encircling tapes disposed on great circles and in planes perpendicular to each other, applying a cover to the article thus constructed, and then molding and vulcanizing the article.

20. The method of making an inflatable athletic ball, which comprises providing a valve-equipped bladder, covering over the bladder while the latter is inflated with a covering comprising turns of thread wound on great circles, then applying a layer of uncured rubber over the thread in the form of sheet rubber of sufficient thickness to provide a cushioning layer, then applying to the uncured rubber layer narrow fabric strips some of which are encircling strips disposed at right angles to each other and others of which are shorter meridian filler strips of narrow fabric laid alongside the first-mentioned strips, applying a layer of uncured rubber covering material to the article thus constructed, and then molding and vulcanizing the article.

21. The method of making an inflatable athletic ball which comprises providing a valve-equipped bladder having an outwardly projecting valve, inflating the bladder, applying to the bladder at 90° to each other encircling narrow fabric tapes one of which has an aperture in which the valve is received, applying over and in contact with the tapes a layer of thread turns produced by winding thread on the bladder with the turns disposed on great circles, then applying over the thread turns a layer of uncured rubber in sheet form having sufficient depth to provide a cushioning layer, applying to the article thus constructed a layer of uncured rubber serving as covering material, and then molding and vulcanizing the article so as to drive the turns of thread outwardly into the layer which is to serve as a cushioning layer.

22. The method of making an inflatable athletic ball which comprises providing a valve-equipped bladder of spherical shape, covering over said bladder while the latter is inflated with a covering comprising turns of thread wound on great circles, applying over said thread turns a layer of uncured rubber in sheet form and of sufficient depth to provide a cushioning layer, applying over said last layer narrow fabric strips disposed on great circles and some of which are encircling strips disposed at 90° to each other and others of which are meridian strips of shorter length filling in the spaces left between the encircling strips, then applying a layer of uncured cover stock in sheet form to the article thus constructed, and then molding and vulcanizing the article whereby the turns of thread are driven outwardly into the uncured rubber layer which is to act as a cushioning layer.

23. The method of making an inflatable athletic ball, which comprises providing a valve-equipped bladder, inflating the bladder, applying to the inflated bladder narrow encircling tapes of fabric disposed on great circles and in planes at 90° to each other, then applying a winding of thread turns disposed on great circles, applying a layer of uncured rubber sheet over the thread winding, applying a layer of covering material to the article thus constructed, and then molding and vulcanizing the article.

24. The method of making an inflatable athletic ball which comprises providing a valve-equipped bladder, covering over said bladder while the latter is inflated with a covering comprising turns of thread wound on great circles, then applying a layer of uncured rubber over the thread, then applying narrow fabric strips disposed on great circles to the uncured rubber so as to provide a substantially complete covering for the article thus constructed, and then molding and vulcanizing the article.

25. The method of making an inflatable athletic ball which comprises providing a valve-equipped bladder of spherical shape, inflating the bladder, applying to the external surface of the inflated bladder a fabric layer, winding on said layer a layer of thread turns disposed on great circles, applying over said thread turns a layer of uncured rubber in sheet form and of sufficient depth to provide a cushioning layer, applying over said layer of uncured rubber a plurality of fabric strips disposed on great circles so as to provide a substantially complete covering for the article thus constructed, and then molding the article under internal pressure so as to drive the thread turns outwardly into the uncured rubber.

26. The method of making an inflatable athletic ball, which comprises providing a valve-equipped bladder, covering over the bladder while the same is inflated with a covering comprising turns of thread wound on great circles, then applying a layer of uncured rubber over the thread in the form of sheet rubber of sufficient thickness to provide a cushioning layer, applying over said layer of uncured rubber a plurality of fabric strips disposed on great circles, then applying a layer of uncured rubber to provide a covering layer for the article thus constructed, and then molding the article under pressure so as to drive the turns of thread outwardly to completely embed the same in the layer which is to serve as a cushioning layer.

CORNELIUS J. CROWLEY.

REFERENCES CITED

The following references are of record in the file of this patent:

UNITED STATES PATENTS

| Number | Name | Date |
|---|---|---|
| 2,131,756 | Roberts | Oct. 4, 1938 |
| 2,194,132 | Voit et al. | Mar. 19, 1940 |
| 2,221,534 | Voit et al. | Nov. 12, 1940 |
| 2,302,985 | Voit et al. | Nov. 24, 1942 |
| 2,367,374 | Reach | Jan. 16, 1945 |
| 2,380,370 | Smith, Jr. | July 10, 1945 |
| 2,399,324 | Clark | Apr. 30, 1946 |